US012717394B2

(12) United States Patent
Herberholz et al.

(10) Patent No.: US 12,717,394 B2

(45) Date of Patent: Aug. 25, 2026

(54) TECHNIQUES FOR MONITORING DIGITAL TIMING MARGINS

(71) Applicant: Arm Limited, Cambridge (GB)

(72) Inventors: Rainer Herberholz, Great Abington (GB); Shidhartha Das, Upper Cambourne (GB)

(73) Assignee: Arm Limited, Cambridge (GB)

( * ) Notice: Subject to any disclaimer, the term of this patent is extended or adjusted under 35 U.S.C. 154(b) by 803 days.

(21) Appl. No.: 17/959,931

(22) Filed: Oct. 4, 2022

(65) Prior Publication Data

US 2024/0111350 A1 Apr. 4, 2024

(51) Int. Cl.
*G06F 1/30* (2006.01)

(52) U.S. Cl.
CPC .................................... *G06F 1/305* (2013.01)

(58) Field of Classification Search
CPC ... G06F 1/305; G06F 11/3058; G06F 30/3312
See application file for complete search history.

(56) References Cited

U.S. PATENT DOCUMENTS

| | | | | |
|---|---|---|---|---|
| 11,409,323 | B2 | 8/2022 | Herberholz et al. | |
| 2013/0300463 | A1* | 11/2013 | Gemmeke | G06F 1/3296 716/108 |
| 2018/0091125 | A1* | 3/2018 | Carlson | H03K 5/19 |
| 2018/0232268 | A1* | 8/2018 | Dosluoglu | G06F 1/28 |

OTHER PUBLICATIONS

M. Nakai et al, Dynamic Voltage and Frequency Management for a Low-Power Embedded Microprocessor, Jan. 2005, IEEE J. Solid-State Circuits, vol. 40, No. 1 (Year: 2005).*

* cited by examiner

*Primary Examiner* — Mark A Connolly
(74) *Attorney, Agent, or Firm* — Pramudji Law Group PLLC; Ari Pramudji

(57) ABSTRACT

Various implementations described herein are directed to a device having core circuitry and hardware with functional paths and canary paths that are co-located with the functional paths. The device may have timing monitors that monitor and measure digital timing margins of the functional paths and the canary paths during droop events. Also, the device may have a control processor that sets-up parameters for hardware droop mitigation based on the digital timing margins, wherein the control processor calibrates the hardware for droop response or for adaptive clock and power control for droop mitigation based on the digital timing margins.

10 Claims, 9 Drawing Sheets

300

Core Deployment Architecture 304

Logic gates of monitors and canary paths are co-located with functional gates/paths.

400

Active Droop Mitigation Response 404

| State | Droop Sensor | Delay setup for Timing Monitors | | |
| --- | --- | --- | --- | --- |
| | | Maximum | Nominal | Minimum |
| Normal Operation | No Alarm (A) | No Alarm | No Alarm | No Alarm |
| Droop Mitigated Gracefully | Alarm | Alarm | No Alarm | No Alarm |
| Droop Mitigated Marginally | Alarm (B) | Alarm | Alarm | No Alarm |
| Brown-Out | Alarm | Alarm | Alarm | Alarm |

FIG. 4

TECHNIQUES FOR MONITORING DIGITAL TIMING MARGINS

BACKGROUND

This section is intended to provide information relevant to understanding the various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In some conventional circuit designs, transient behaviour of processors induces voltage transients that need to be margined—for at the cost of power and performance, and higher performance cores typically switch more current, inducing deeper droops. As such, this power and performance impact may be amplified at lower operating voltages required in advanced CMOS nodes. The ability of a digital circuit to function under transient voltage conditions can be limited by the timing margin of its functional paths. Thus, techniques to measure digital timing margins within digital circuits may be needed to tune active voltage droop mitigation schemes for some physical implementations.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

FIG. 4 illustrates the severity of a droop event as indicated by timing monitors and its correlation to the expected triggering of a fast droop sensor.

DETAILED DESCRIPTION

Various implementations described herein are related to monitoring timing margins in digital circuits, including allowing for calibration of active droop mitigation schemes to a specific physical system implementation. Also, the timing monitor schemes and techniques may refer to combined use of functional and canary, whereby functional paths have data-dependent toggling behavior, whereas canary paths toggle independent of the workload processed in the circuit. Thus, various implementations described herein provide for schemes and techniques that enable online monitoring of digital timing margin within a processor or digital logic. Also, various implementations described herein allow the use of canary circuits with predictable switching characteristics for online monitoring following a calibration of timing characteristics in local functional paths.

Various implementations of active droop mitigation schemes and techniques for monitoring digital timing margins are described herein with reference to FIGS. 1-5.

Figure 1:
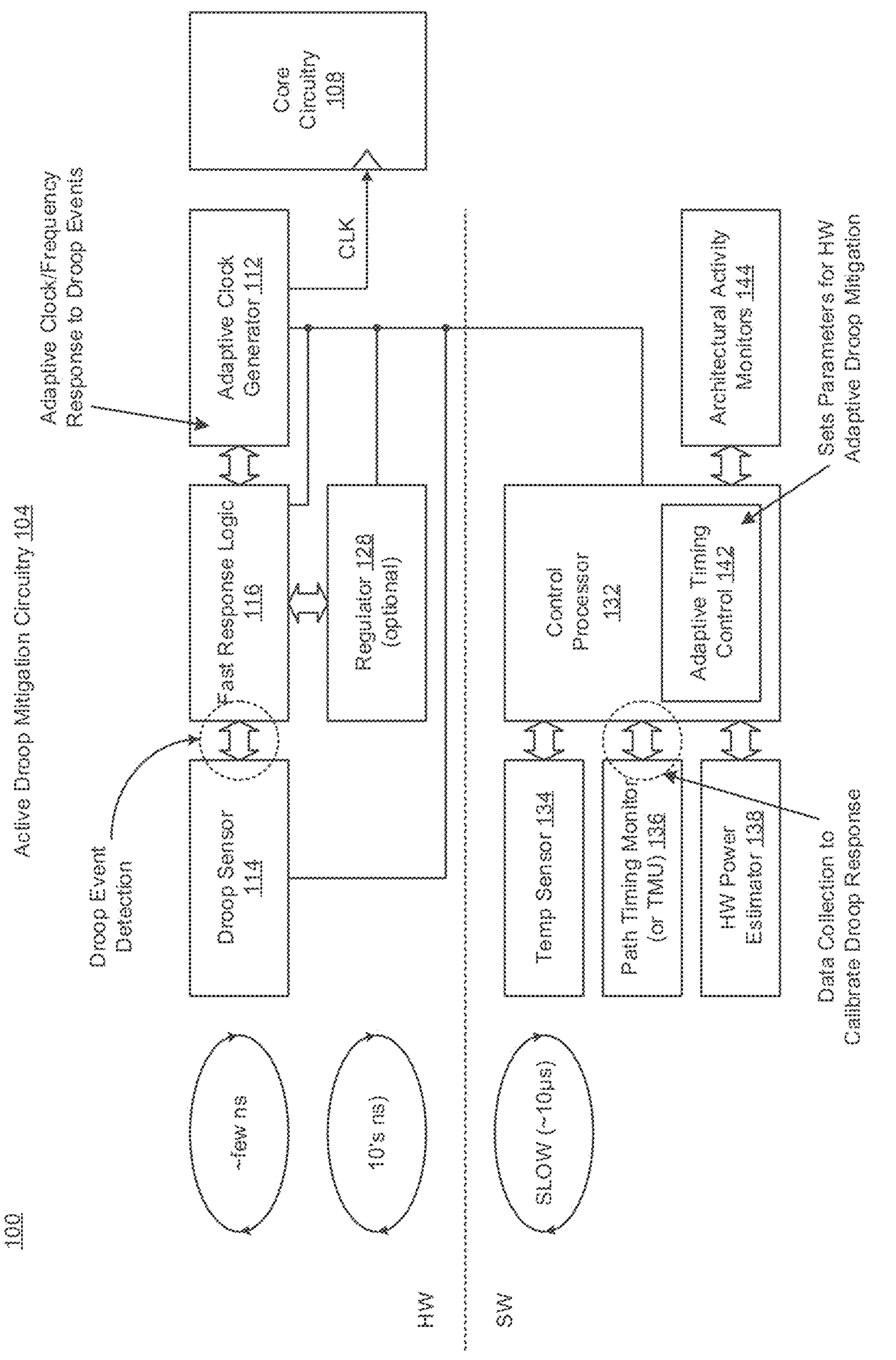
FIG. 1 illustrates a diagram of active droop mitigation circuitry in accordance with various implementations described herein.

FIG. 1 illustrates a schematic diagram 100 of an active droop mitigation circuitry 104, combining fast response hardware control loops with a software controlled layer used to tune the hardware responses to a system, e.g., by monitoring digital timing margins of functional paths in accordance with various implementations described herein.

In various implementations, the active droop mitigation circuitry 104 in FIG. 1 may be implemented as a system or a device having integrated circuit (IC) components that are arranged and coupled together as an assemblage or combination of parts that may provide for physical circuit layout design and related structures. In some instances, a method of designing, fabricating, building and/or providing the active droop mitigation circuitry 104 as an integrated system or device may involve use of IC circuit components described herein so as to thereby implement various active droop mitigation schemes and techniques associated therewith. Moreover, the active droop mitigation circuitry 104 may be integrated with computing circuitry and related components on a single chip, and also, the active droop mitigation circuitry 104 may be implemented within embedded systems for automotive, electronic, mobile, server and Internet-of-things (IoT) applications.

As shown in FIG. 1, the active droop mitigation circuitry 104 may have various circuitry including, e.g., core circuitry 108, timing monitors 136 and control processor 132, along with associated software processes running on the control processor, e.g., adaptive timing control process 142. In some instances, the various circuitry 108, 132, 136 may be coupled together to provide active droop mitigation circuitry for monitoring digital timing paths. Also, the active droop mitigation circuitry 104 may have a hardware (HW) stage including a fast stage (e.g., 10's ns) with a supply voltage (VDD) regulator 128 (that is optional), and the HW stage may have a faster stage (e.g., few ns) with droop sensors 114, fast response logic 116, and an adaptive clock generator 112 that provides a clock signal CLK to the core circuitry 108. In addition, the active droop mitigation circuitry 104 may have a stage operating under software (SW) control including a slow stage (e.g., SLOW ~10 μs) with the control processor 132, temperature sensor 134, path timing monitors 136, HW power estimator 138 and architectural activity monitors 144.

In various applications, the path timing monitors 136 may be referred to as path margin monitors and/or timing monitor units (TMUs). Also, the path timing monitors 136 may express timing margins in units of gate delay.

In various implementations, the core circuitry 108 includes functional paths 214 comprising logic gates between registers 234 and 236 along with canary paths 418 that are co-located with the functional paths. The timing monitors 136 may be configured to monitor and measure digital timing margins of the functional paths and/or the canary paths, including during droop events. Also, the control processor 132 (and/or the adaptive timing control process 142) may configure the HW components for droop reduction and/or for adaptive clock and power control for droop mitigation based on the digital timing margins. In some applications, path timing monitors 136 may be used to measure such margins in units of gate delay and may be located physically at multiple locations within the floorplan of core circuitry 108.

In various implementations, the core circuitry 108 may execute a test sequence that exercises the functional paths with predetermined path activation for each functional path so as to identify the observation point with a minimum timing margin specific to a device under test. The Adaptive Timing Control Process 142 running on the control processor 132 may determine a required delay to add to canary paths, such that the canary paths indicate a timing alarm under equivalent conditions that may lead to an alarm of the observable functional paths while running the test workload, and Adaptive Timing Control Process 142 use programmable delay 210 to calibrate the delays between the worst observable functional path and the canary paths. Also, during operation of the core circuitry, the control processor 132 may interface with the timing monitors 136 to monitor the canary paths for alarms and also to determine severity of the droop events based on the alarms observed from the timing monitors, and each timing monitor may be assigned to a group and each group is assigned a delay margin so as to classify severity of the droop events. In some applications, as described herein, the timing monitors 136 may be referred to as path margin monitors.

The observable functional paths may have more critical timing characteristics compared to nearby non-observable paths, but will not cause a set-up warning 254 due to the data-dependent nature of path activation, and the canary paths are not part of the functional circuitry and deterministic path activation, such as toggling with each clock cycle. The timing monitors 136 may be configured to capture an observable functional paths or a canary path. The timing monitors 136 may monitor the digital timing margins so as to refine voltage supply and clock setup of the core circuitry, and the Adaptive Timing Control process 142 may select and/or add additional delays 210 to the input signal of a flop 238 so as to detect timing margins in units of gate delay. Also, the observable functional paths may include paths having delay that is sensitive to transistor skew, complexity of gates, and/or averaging of random variation, and also, the observable functional paths may include wire paths having dominated by delay that are sensitive to skew of the driving transistor stag and wire skew.

In some implementations, the fast response logic 116 comprises sequential logic gates configured to receive an input from one or both of the HW power estimator 138, and the droop sensor 114, providing outputs to one or both of clock generator 112 and VDD regulator 128. The droop sensor 114 may be configured to sense droop events related to the supply voltage (VDD), and when the droop sensor 114 senses (or detects) a droop event, the droop sensor 114 provides a HW signal to the fast response logic 116. The HW power estimator 138 may provide a HW signal to the fast response logic 116. The fast response logic path applied, as well as trigger conditions for the droop sensor 114 and the HW power estimator 138, as well as responses applied by the Adaptive Clock Generator 112 and Regulator 128 may be programmed by the adaptive timing control process 142. The outputs of the fast response logic 116 connect to HW control inputs of one or both of VDD regulator 128 and the clock generator 112. These HW signals apply a droop mitigation response, consisting of one or both of a modulation of the clock frequency or change in the voltage rail supplying core circuitry 108. In some applications, the fast response logic 116 is configured to provide for adaptive clock response to droop events that are sensed (or detected) in relation to supply voltage (VDD).

In various implementations, the control processor 132 is configured to interface and communicate via a digital control bus with the fast response logic 116, the clock generator 112, the VDD regulator 128. The control processor 132 may be configured to interface with and communicate with temperature sensors 134, timing monitors 136, and the digital control interface of the HW power estimator 138 and the architectural activity monitors 144. In addition, the control processor 132 runs the adaptive timing control SW process 142.

Figure 2A:
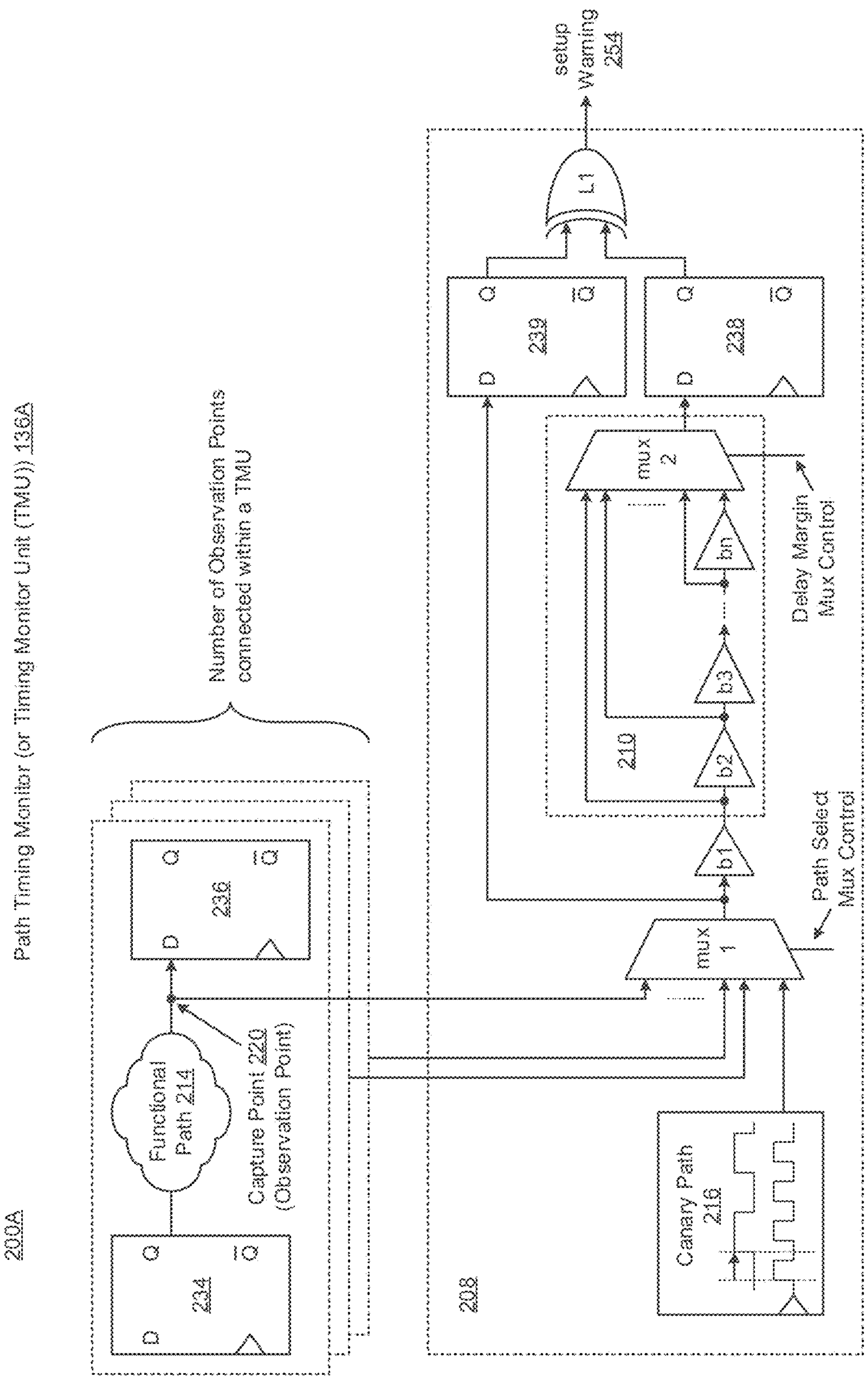
FIGS. 2A-2B illustrate diagrams of path timing monitor circuitry in accordance with various implementations described herein.
Figure 2B:
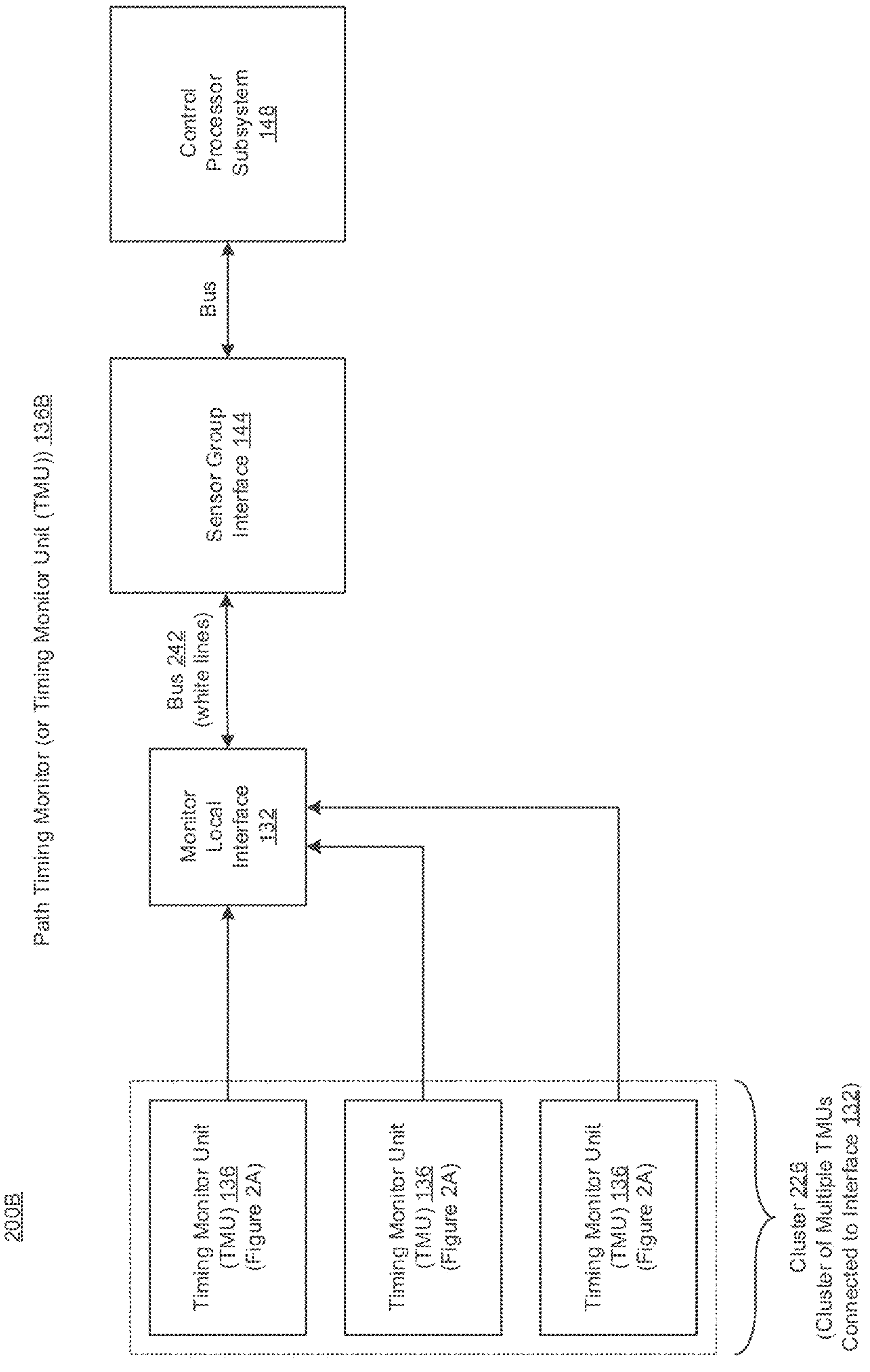

FIG. 2A illustrates a schematic diagram 200A of a path timing monitor 136A including a timing monitor unit (TMU) 208 and connections to observation points 220 in accordance with various implementations described herein. FIG. 2B illustrates a schematic diagram 200B of a cluster 226 of path timing monitors or timing monitor units (TMUs) 136A in accordance with various implementations described herein.

In various implementations, the timing monitor 136A in FIG. 2A may be implemented as part of an integrated circuit (IC) having components that are arranged and coupled together as an assemblage or combination of parts that provide for physical circuit layout design and related structures. In some instances, a method of designing, fabricating, building and providing the timing monitor circuitry 136A as part of an integrated system or device may involve use of IC circuit components described herein. Also, the timing monitor circuitry 136A may be integrated with computing circuitry and related components on a single chip, and further, the active droop mitigation circuitry 104 may be implemented within embedded systems for automotive, electronic, mobile, server and Internet-of-things (IoT) applications.

As shown in FIG. 2A, the timing monitor circuitry 136A may have various circuitry including, e.g., latches (238, 239), a number (n) of buffers (b1, b2, b3, . . . , bn), logic gate (L1) and one or more multiplexers (mux). FIG. 2A shows application of sensing setup timing margin at the input of latch 236. The timing path monitor 136A may refer to a number of observation points that are connected within the path timing monitor or TMU 208. In some applications, a maximum number of observation points may depend on a width of the Path Select MUX Control, such as, e.g., any number of observation pints including 2, 4, 8, 16, 24, 32, etc. Also, a capture point 220 (or observation point) may be provided to a first mux (mux1). Also, multiple capture points 220 (or observation points) are provided to the first mux (mux1) along with output from the canary path 216. Also, output from mux1 is provided to buffer (b1) and latch (239). Also, outputs from buffers (b1, b2, b3, . . . , bn) are provided to a second mux (mux2). Also, a path select mux control signal is provided to the first mux (mux1'), and a delay margin mux control signal is provided to the second mux (mux2). Also, the output of the second mux (mux2) is provided to latch 238, and the outputs of latches (238, 239) are provided to logic gate (L1, e.g., XOR gate) that provides an output signal as a setup warning signal 254. As described herein, core circuitry 108 has many functional paths with a distribution of setup timing margins, and thus, it should be understood that the functional paths may refer to any path that based on timing analysis may have a delay characteristic similar critical timing paths.

In some implementations, the TMU 208 may have buffer (b2) as a first delay element, a second delay element 210, a setup capture latch 238, and setup warning comparison logic L1. The first delay buffer (b1) may be a delay buffer or similar delay. The output of first delay buffer (b1) is fed into the second delay 210, which includes multiple delay buffers (b2, b3, . . . , bn) or similar delays and multiplexer (mux2) to provide programmable, variable delay at the input of capture latch 238. Also, the delay margin multiplexer (mux2) may provide a programmable delay for signals captured by capture latch 238. The second delay 210 may operate as a tunable delay configurable at runtime with selection by the multiplexer (mux). In some applications, the first delay buffer (b1) and the second delay 210 may be combined into a single delay element.

In some implementations, setup capture latch 238 may be a flip-flop or similar capture device that latches the output of the multiplexer (mux) until a next cycle of clock (CLK) signal. The setup warning comparison logic (L1) use a XOR logic gate or similar comparison device that is coupled to the output of setup capture latch 238 and the output of capture latch 239. Also, setup warning comparison logic (L1) may output the setup warning signal 254 when the desired timing margin is not met. Also, a timing warning 254 may be generated whenever the setup timing margin at the output of the path select control MUX is less than the programmable delay 210.

In some implementations, FIG. 2B shows cluster 226 of path timing monitors or TMUs 208 of FIG. 2A that are coupled (or connected) to a monitor local interface 132. The monitor local interface 132 receives signals form the TMUs 208, and communicates via a digital control bus to a sensor group interface 144 via bus lines 242. The sensor group interface has a digital bus connection to a control processor subsystem 148, which may include the control processor 132 shown in FIG. 1.

Figure 3:
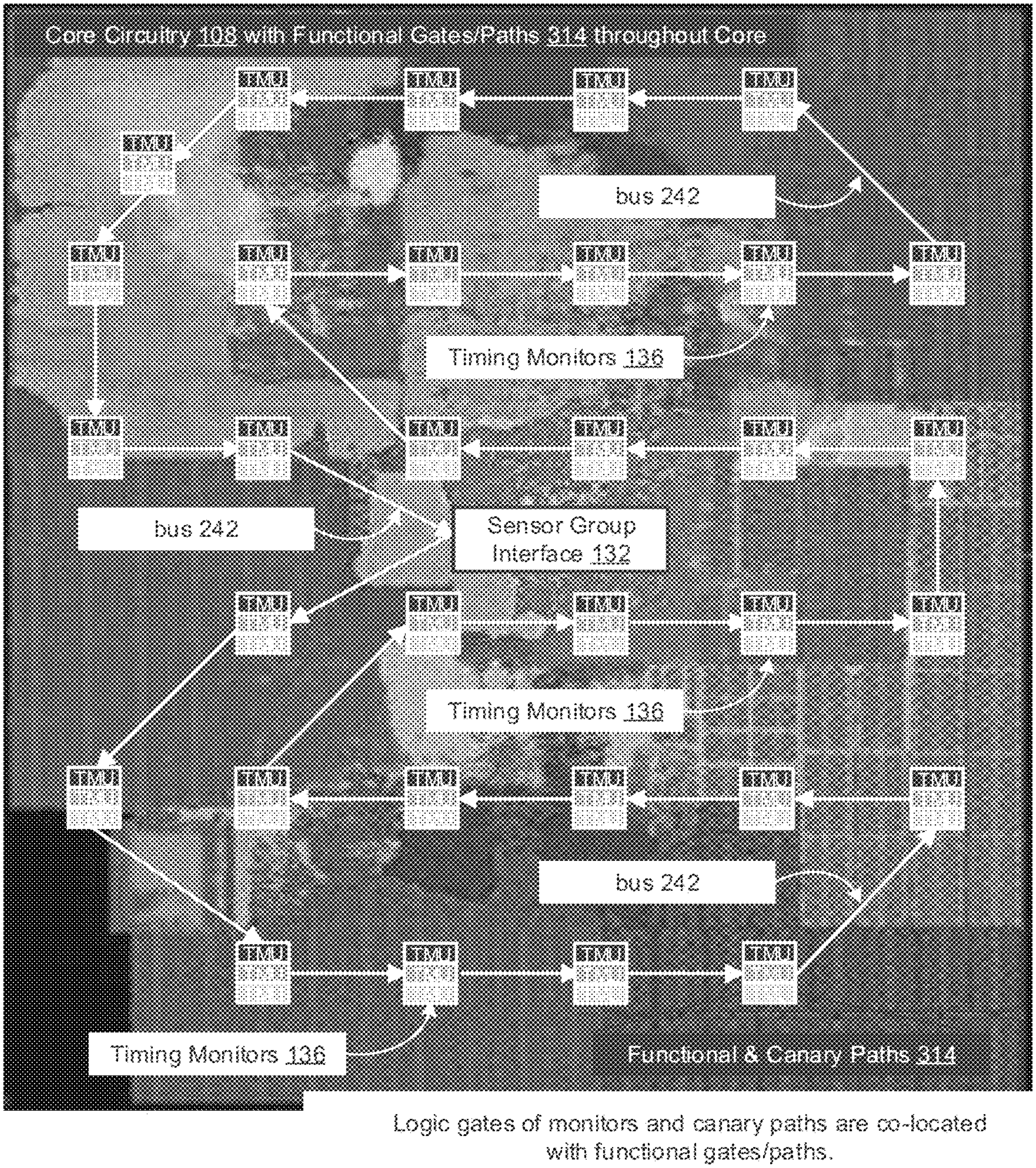
FIG. 3 illustrates deployment to a processor core in accordance with various implementations described herein.

FIG. 3 illustrates a graphic diagram 300 of a deployment of timing sensors in processor core 304 in accordance with various implementations described herein. In some applications, deployment 304 refers to timing monitor deployment within a core or core circuitry that is formed on a semiconductor wafer for an SoC (System-on-Chip).

As shown in FIG. 3, the core deployment architecture 304 may have the core circuitry 108 as formed on an SoC with functional paths 314. As described herein, timing monitors (TMUs) 208 may connect to canary paths 218 and interface to the Control Processor 132. In some implementations, the timing monitors refer to timing monitor units (TMUs) that are spread across the core, and also, the timing monitor units (TMUs) are connected to the adaptive timing controller or circuitry (TM_CTRL) 142 that interfaces to the control processor 132.

In some applications, each timing monitor (TMU) 208 may select multiple local timing paths, whereby a TMU 208 with the least slack is selected for runtime monitoring. Also, groups of monitors are assigned different slack limits to assess the severity of droop events on timing margins in functional paths 314, and each timing monitor (TMU) 208 experiences droop events and mitigation of droop events. During continuous operation, alarms are collected from timing monitors (TMUs) 208 periodically and after recovery from a transient di/dt droop event indicated by droop detector 114. Also, in some scenarios, a fault indicated by the timing monitor (TMU) 208 without event indication by droop detector 114 may indicate that the system needs to be re-calibrated. In this instance, the supply voltage (VDD) may be increased and/or the frequency may be lowered under control of the control processor 132 so as to increase the timing margin while the monitoring system is suspended.

Various implementations described herein are directed to various schemes and techniques that monitor digital timing margins for refining voltage supply and clock setup of a design. Also, another use refers to using measurement of timing margins during di/dt events so as to calibrate hardware-based schemes for di/dt reduction or adaptive clock and power control for droop mitigation. The various schemes and techniques described herein are based on one of two principles: monitoring functional paths within the design, and/or monitoring canary circuits that are co-located with functional paths that may not be part of the design's function. In some applications, the various schemes and techniques described herein may combine these two principles and may be implemented using timing monitors, such as, e.g., path margin monitors.

In some implementations, the timing of functional paths is critical for the function of a design; however, monitoring representative functional paths directly may miss droop events affecting other, non-monitored functional paths. Various contributions to missed events refer to toggle rate of the monitored paths and data dependencies, e.g., if a path is not toggling during a cycle, it may not produce a set-up warning 254. Also, setup margin for a toggling input to a capturing flop may depend on the way the transitions resolve along the combinatorial path, which may be data dependent. The use of canary paths for runtime monitoring prevents these shortcomings, provided proper calibration between the set-up timing of the canary to a chosen functional path has taken place. Within a local area of N functional paths and at least one canary path may be monitored (e.g., by using a multiplexed input to the timing monitor or by replicating the timing monitor).

In various applications, during a training sequence, one or more or all functional paths may be tested under a test-workload against the same delay 210 to determine the functional path with minimum timing margin specific to the device under test. Also, the delay setting for 210 may be determined for which the canary path indicates a timing alarm under the conditions that lead to an alarm of the functional path while running the test workload. This sequence may be repeated and results in a calibration of delays between the worst functional path and the canary path. During operation of the design, the canary path may be monitored for alarms, which may eliminate any data dependencies in the pattern of alarms observed from a multitude of timing monitors and allows for quantitative analysis of local variations across a design along with severity of droop events.

In various implementations, to classify the severity of droop events, each timing monitor (or path margin monitor unit) may be assigned to a group, and each group may be assigned to a delay margin. Also, during runtime, a fraction of timing monitors may be switched from the canary path, cycling to observe a functional path. Overtime, this concept may indicate any deviations between the functional paths and the setup determined for the canary paths, wherein if a deviation is found, the delay limit used for the canary path may be adjusted. Further, this concept may be due to workloads that are worse than the workload used for training, as well as aging of functional paths or canary paths.

FIG. 4 illustrates a table diagram 400 to show the use of timing monitors to characterize the operational status of the HW droop mitigation response in accordance with various implementations described herein.

FIG. 4 shows the operational state expressed by alarm conditions for the timing monitor in function of the setup margin configured using the mux in 210 versus triggers generated by the droop sensor 114. In some applications, the active droop mitigation status 404 indicates timing monitors setup for continuous monitoring by assigning them within groups of different delay settings. Also, the active droop mitigation status 404 may be used to adjust the parameters for HW-based droop indication and droop mitigation, including sensitivity of the droop sensor, as well as the mitigation applied. Also, the active droop mitigation status

404 may be used to tune droop for available response characteristics to the timing monitor observation, if necessary to increase the timing margins for normal operation. Also, the number of timing monitors generating alarms may indicate a particular operational state and their localization within the floorplan of the core circuitry 108 may be further used to classify the severity of transient di/dt droop events.

In various applications, during normal operation, the droop sensor may indicate a no alarm state, wherein delay setup for timing monitors may refer to the no alarm state in maximum-nominal-minimum delay margin conditions. If droop is mitigated gracefully, then the droop sensor may indicate an alarm state, wherein delay setup for timing monitors may refer to the alarm state in the maximum alarm condition and the no alarm state in nominal-minimum delay margin conditions. Also, if droop is mitigated marginally, then the droop sensor may indicate the alarm state, wherein the timing monitors refer to the alarm state in the maximum and nominal delay margin conditions and the no alarm state in minimum delay condition. Further, if in a potential brown-out state of operation, then the droop sensor may indicate the alarm state, wherein the delay setup for timing monitors refers to the alarm state in all of the delay set-up groups, the maximum-nominal-minimum delay margin conditions. Under some scenarios, alarm states may be reflected by droop sensors and timing margin sensors may be misaligned (e.g., A and/or B). If such a cross-over occurs consistently for many instances of the timing monitors, the adaptive droop mitigation system needs to be re-calibrated.

In some applications, the active droop mitigation circuitry may be implemented in a device having core circuitry including hardware with functional paths and canary paths that are co-located with the functional paths. The device may have timing monitors that monitor and measure digital timing margins of the functional paths and the canary paths during droop events. The device may have a control processor that sets-up parameters for hardware droop mitigation based on the digital timing margins, and the control processor may calibrate the hardware for droop response and/or for adaptive clock and power control for droop mitigation based on the digital timing margins.

In some implementations, as shown in FIG. 4, the timing monitors may be clustered in sets of multiple timing monitors (e.g., 3), wherein a first timing monitor in each set of multiple timing monitors may provide for an upper boundary level of alarm (e.g., maximum) for droop mitigation. Also, a second timing monitor in each set of multiple timing monitors may provide for an intermediate level of alarm (e.g., nominal) for droop mitigation. Also, a third timing monitor in each set of multiple timing monitors may provide for a lower boundary level of alarm (e.g., minimum) for droop mitigation.

In some implementations, each timing monitor may provide multiple capture observation points for measuring digital timing margins associated with the functional paths. Also, the core circuitry may execute a test sequence that tests the functional paths under a test-workload with predetermined path activation for each functional path so as to determine at least one functional path with a minimum timing margin specific to the device under test. Also, the adaptive timing control process executing on the control processor may determine the required delay to add to canary paths, such that the canary paths indicate a timing alarm under conditions that lead to an alarm of the functional paths while running the test workload, and also, the control process may evaluate the required delay to calibrate the delays between the worst functional path and the canary paths.

In some implementations, during operation of the core circuitry, the control processor may interface with the timing monitors to monitor the canary paths for alarms and to determine severity of the droop events based on event detection by the droop sensor, and also, each timing monitor may be assigned to a group and each group is assigned a delay margin so as to classify severity of the droop events. Also, the timing monitors may monitor the digital timing margins so as to refine voltage supply and clock setup of the core circuitry. Also, the timing monitors may select and add additional delays to the input signal of a flop so as to detect timing margins in units of gate delay. Also, the canary circuits may have predictable switching characteristics that are used for online monitoring following a calibration to the timing characteristics of the functional paths. Also, the functional paths may include transistor paths with delays that are sensitive to transistor skew, complexity of gates, and averaging of random variation. Also, the functional paths may include interconnect paths with delays that are sensitive to transistor skew, wire skew, and exposure to random variation of the driver.

Figure 5:
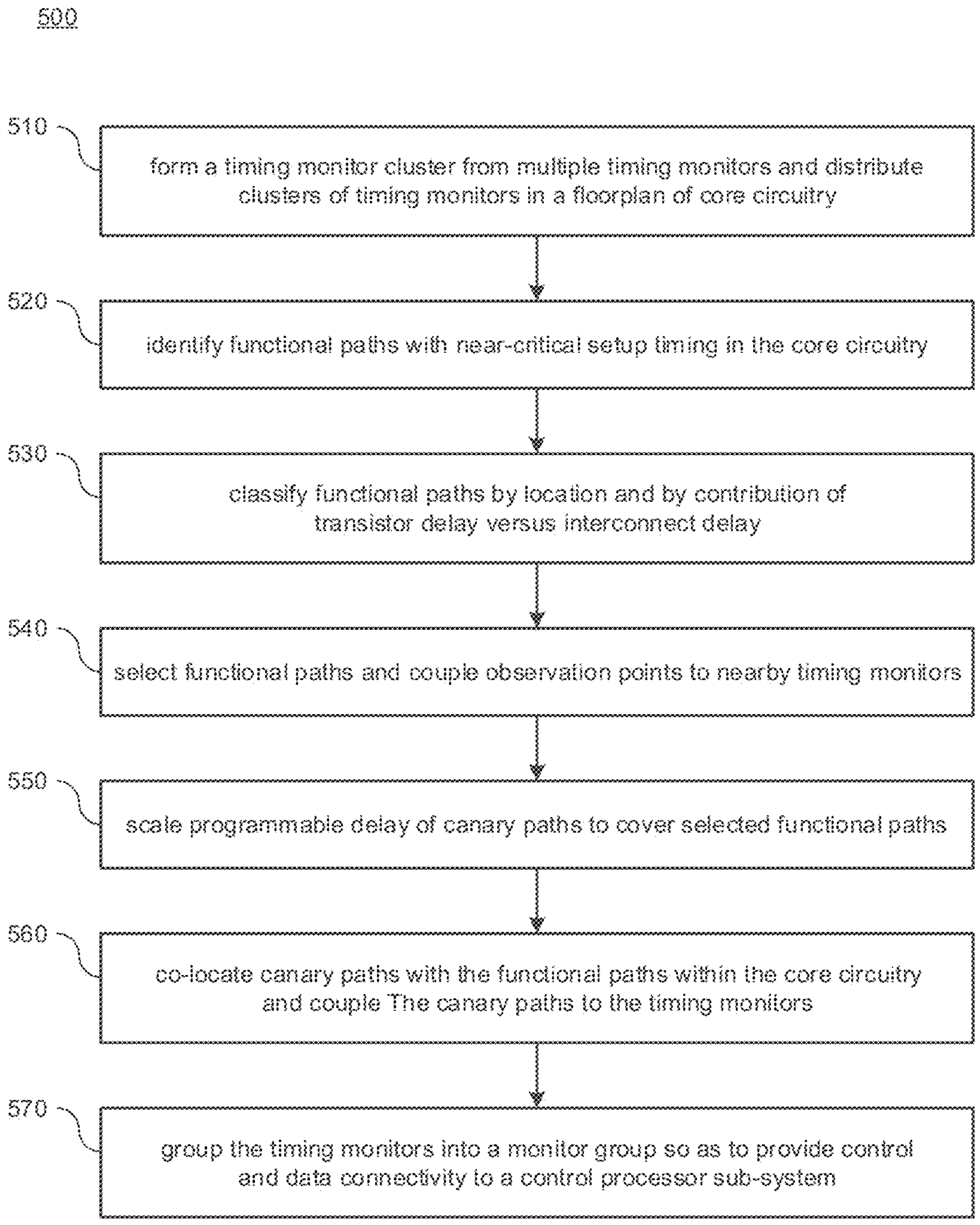
FIGS. 5-8 illustrate process diagrams of various methods of instantiating and setting-up timing monitors accordance with various implementations described herein.

FIG. 5 illustrates a process diagram of a method 500 for implementing timing monitors in accordance with various implementations described herein. In various applications, method 500 may be used for monitoring digital timing margins.

It should be understood that even though method 500 may indicate a particular order of operation execution, in some cases, various portions of the operations may be executed in a different order, and on different systems. In other cases, other operations and/or steps may be added to and/or omitted from method 500. Also, method 500 may be implemented in hardware and/or software. If implemented in hardware, method 500 may be implemented with components and/or circuitry, as described herein in reference to FIGS. 1-4. Also, if implemented in software, method 500 may be implemented as a program and/or software instruction process that is configured for providing the various schemes and techniques described herein. Also, if implemented in software, instructions related to implementing method 500 may be recorded in memory and/or a database. For instance, various types of computing devices having at least one processor and memory may be configured to perform method 500.

In various implementations, method 500 may refer to a method of designing, providing, building, fabricating and/or manufacturing a timing monitoring scheme to supervise active droop mitigation methods as an integrated system, device and/or circuitry that may involve use of the various circuit components described herein so as to implement the various schemes and techniques associated therewith. In some implementations, the timing monitors and active droop mitigation architecture may be integrated with computing circuitry and related components on a single chip, and also, the timing monitors and active droop mitigation architecture may be implemented in various embedded chip-level systems for various electronic, mobile and Internet-of-things (IoT) applications, including remote sensor node applications.

At block 510, method 500 may form a timing monitor cluster from multiple timing monitors and distribute clusters of timing monitors in a floorplan of core circuitry. At block 520, method 500 may identify functional paths with near-critical setup timing in the core circuitry based on timing analysis during digital design implementation. At block 530, method may classify functional paths by location and contribution of transistor delay versus interconnect delay. At block 540, method 500 may select functional paths and couple their observation points to nearby timing monitors. At block 550, method 500 may scale programmable delay of canary paths to cover selected functional paths. At block 560, method 500 may co-locate canary paths nearby the functional paths within the core circuitry and couple the canary paths to the timing monitors, where nearby implies that both the canary and functional path experience the same transients of the supply voltage within the power distribution network of the design. At block 570, method 500 may group the timing monitors into a monitor group so as to provide control and data connectivity to a control processor subsystem. Also, in some applications, method 500 may couple the timing monitors to the functional paths and the canary paths to monitor and measure digital timing margins of s selected path during droop events. Also, in some applications, method 500 may interface the control processor with the timing monitors to control the timing monitors from a software process and enable data collection from the monitors.

In various implementations, method 500 may perform a test sequence with the control processor to test functional paths under a test-workload by using the same delay for each functional path so as to determine at least one functional path with a minimum timing margin specific to a device under test. Also, during operation of the core circuitry, method 500 may interface the control processor with the timing monitors so as to monitor the canary paths for alarms and/or to determine severity of the droop events based on the alarms observed from the timing monitors. Also, each monitor units may be assigned to a group, and in addition, each group may be assigned a delay margin so as to classify the severity of the droop events.

In various implementations, method 500 may configure the control processor to determine the operational delay for which the canary paths indicate a timing alarm under conditions that lead to an alarm of the functional paths while running the test workload, wherein the adaptive timing control process running on the control processor may use the delay of functional paths to calibrate the delays for the canary path. Also, the functional paths may have timing margins that are critical for function of the core circuitry, and timing failure detected for the canary paths have no impact on the function of the core circuitry. Also, timing monitors may select and add additional delays to the input signal of a flop so as to detect timing margins in units of gate delay.

In various implementations, the canary circuits may have predictable switching characteristics that may be used for online monitoring following a calibration to the timing characteristics of the functional paths. Also, the functional paths include transistor paths may be categorized into paths having delays that are sensitive to transistor skew, complexity of gates, and/or averaging of random variation, and further, the functional paths may be categorized into wire paths with delays that may be sensitive to transistor skew, wire skew, and/or exposure to random variation of driver logic.

Figure 6:
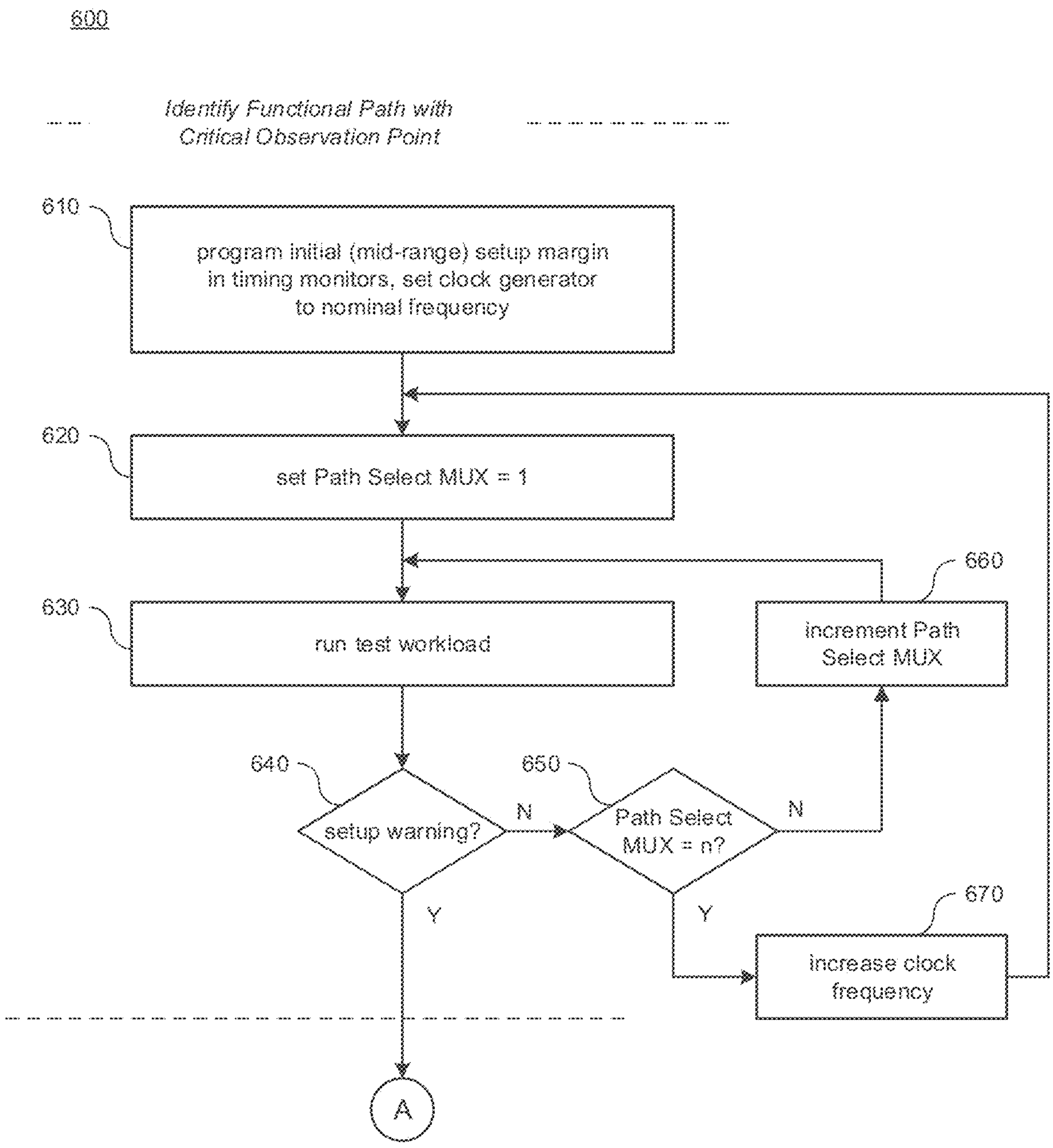
Figure 7:
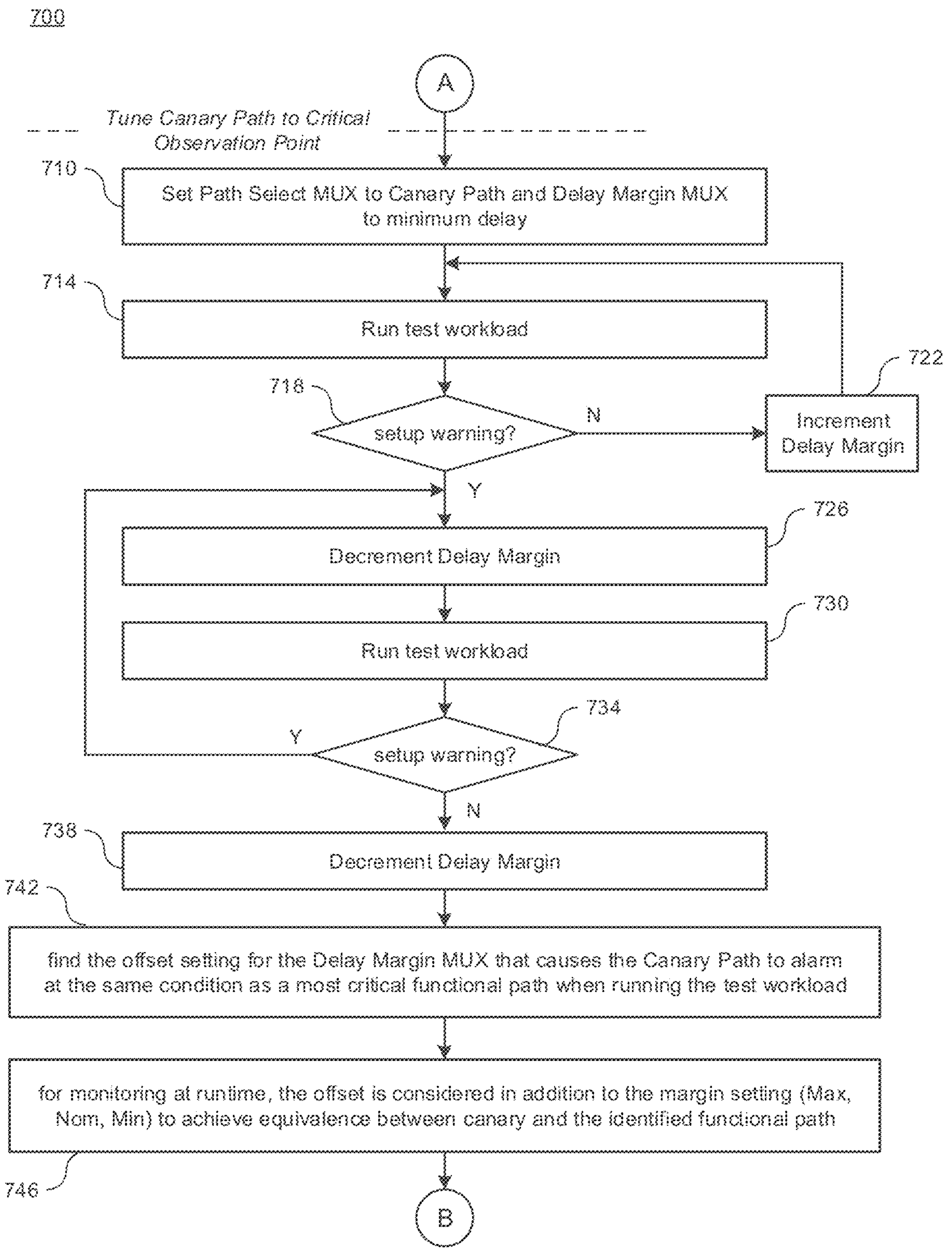
Figure 8:
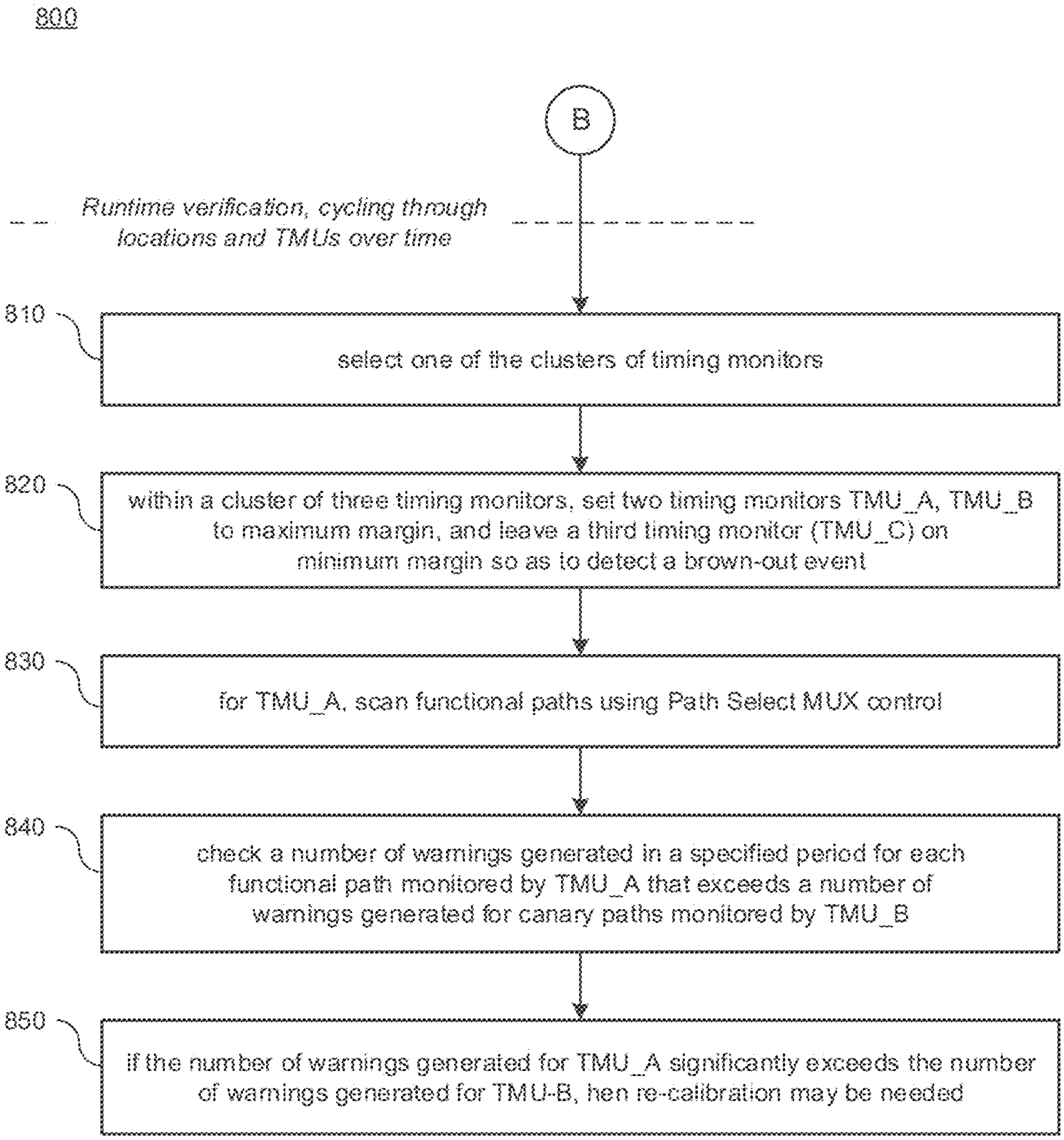

FIGS. 6-8 illustrate process diagrams of methods 500 for implementing a timing monitoring scheme in accordance with various implementations described herein. In various applications, FIG. 6 provides a method 600 that may be used to identify critical observation points from the observable functional paths, FIG. 7 provides a method 700 that may be used to tune canary paths to critical observation points, and FIG. 8 provides a method 800 that may be used for runtime verification of the result of method 700 by cycling through one or more or all locations and timing monitors (i.e., path timing monitors, or timing monitor units) over time.

It should be understood that even though methods 600, 700, 800 may indicate a particular order of operation execution, in some cases, various portions of the operations may be executed in a different order, and/or on different systems. In other cases, various other operations and/or steps may be added to and/or omitted from methods 600, 700, 800. Also, methods 600, 700, 800 may be implemented in hardware and/or software. If implemented in hardware, methods 600, 700, 800 may be implemented with components and/or circuitry, as described herein in reference to FIGS. 1-4. Also, if implemented in software, methods 600, 700, 800 may be implemented as a program and/or software instruction process that is configured for providing the various schemes and techniques described herein. Also, if implemented in software, instructions related to implementing methods 600, 700, 800 may be recorded in memory and/or a database. For instance, various types of computing devices having at least one processor and memory may be configured to perform methods 600, 700, 800.

In some implementations, methods 600, 700, 800 may refer to various methods of designing, providing, building, fabricating and/or manufacturing active droop mitigation architecture as an integrated system, device and/or circuitry that may involve use of the various circuit components described herein so as to implement the various schemes and techniques associated therewith. Also, in some implementations, active droop mitigation architecture may be integrated with various computing circuitry and related components on a single chip, and also, the active droop mitigation architecture may be implemented in various embedded chip-level systems for various electronic, mobile and Internet-of-things (IoT) applications, including remote sensor node applications.

At block 610, method 600 may program initial (mid-range) setup margin in the timing monitors and set clock generator to nominal frequency. At block 620, method 600 may set the path select multiplexer (MUX) equal to logic one (1). At block 630, method 600 may run a test workload. At decision block 640, method 600 may determine whether a setup warning has been triggered. If yes, then method 600 may proceed to method 700 in FIG. 7. However, if no, then method 600 may proceed to decision block 650, wherein method 600 may determine whether the path select MUX is equal to number (n). If yes, then method 600 may proceed to block 670, wherein method 600 may increase the clock frequency, and then method 600 may proceed to block 620. However, if no, then method 600 may proceed to block 660, wherein method 600 may increment the path select MUX (e.g., by 1), and then method may proceed to block 630.

In various implementations, critical observation points may refer to one or more observation points with minimum setup timing margin, wherein sub-critical paths may be selected for the observation points so as to ensure that their timing does not become critical by coupling them to the timing monitors, path timing monitors, or TMUs.

At block 710, method 700 may set the path select MUX to the canary path and set the delay margin MUX to a minimum delay. At block 714, method 700 may run a test workload. At decision block 718, method 700 may determine whether a setup warning has been triggered. If no, then method 700 may proceed to block 722, wherein method 700 may increment the delay margin, and then method 700 may proceed to block 714. Otherwise, if yes, then method 700 may proceed to block 726, wherein method 700 may decrement the delay margin. At block 730, method 700 may run another test workload. At decision block 734, method 700 may determine whether another setup warning has been triggered. If yes, then method 700 may return to block 726. Otherwise, if no, then method 700 may proceed to block 738, wherein method 700 may decrement the delay margin. At block 742, method 700 may find the offset setting for the Delay Margin MUX that causes the canary path to alarm at the same condition as a most critical functional path when running the test workload. At block 746, method 700 may monitor functional paths and canary paths, wherein for monitoring at runtime, the offset may be considered in addition to the margin setting (Max, Nom, Min) so as to achieve equivalence between the canary path and the identified functional path. Next, in some implementations, method 700 in FIG. 7 may then proceed to method 8 in FIG. 8.

At block 810, method 800 may select at least one cluster of timing monitors, or path timing monitors, or timing monitor units (TMUs). At block 820, within a cluster of TMUs, method 800 may set multiple timing monitors (e.g., TMU_A, TMU_B) to maximum margin, and then leave another timing monitor (e.g., TMU_C) on minimum margin so as to detect a brown-out event. At block 830, for TMU_A, method 800 may scan functional paths using path select MUX control. At block 840, method 800 may check a number of warnings generated in a specified period for each functional path monitored by TMU_A that exceeds a number of warnings generated for canary paths monitored by TMU_B. At block 850, if the number of warnings generated for TMU_A significantly exceeds the number of warnings generated for TMU-B, then re-calibration may be needed, and then method 800 may therefore perform a re-calibration procedure.

In various implementations, in reference to FIGS. 6-8, the methods 600, 700, 800 may be configured to perform various processes as follow. For instance, the methods may identify functional paths in core circuitry with minimum setup timing margins, co-locate canary paths with the functional paths in the core circuitry, calibrate the functional paths by running a test workload on the functional paths, tune the canary paths to the functional paths, and perform runtime verification by cycling through locations of the functional paths and the timing monitors over a predetermined period of time.

In some implementations, the methods may identify and calibrate the functional paths in the core circuitry with minimum setup timing margins, e.g., by programming an initial setup timing margin in the timing monitors, selecting the functional paths for testing, running test workloads on the selected functional paths, and identifying and storing setup warnings on the selected functional paths based on results of running the test workloads.

In some implementations, the methods may tune the canary paths to the functional paths, e.g., by setting the selected functional paths to the canary paths, setting a delay timing margin for the canary paths to a minimum timing delay, running additional test workloads on the selected functional paths, and identifying and storing additional setup warnings on the selected functional paths based on results of running the additional test workloads.

In some implementations, the methods may tune the canary paths to the functional paths, e.g., by decrementing the delay timing margin, finding an offset setting for the delay timing margin that causes the canary paths to alarm at similar conditions as a most critical functional path when running the test workloads, and when monitoring at runtime, considering the offset setting in addition to different levels of alarms so as to achieve equivalence between the canary paths and an identified functional path related to the most critical functional path.

In some implementations, the methods may cycle through the locations of the functional paths and the timing monitors over the predetermined period of time, e.g., by selecting a cluster of timing monitors, and within the cluster of timing monitors, setting at least two timing monitors to an upper boundary timing margin and then leaving at least one timing monitor on a lower boundary timing margin so as to detect a brown-out event.

In some implementations, the methods may cycle through the locations of the functional paths and the timing monitors over the predetermined period of time, e.g., within the cluster of timing monitors, by scanning the functional paths with a first timing monitor of the at least two timing monitors, within the cluster of timing monitors, by scanning the canary paths with a second timing monitor of the at least two timing monitors, and by checking a number of setup warnings generated by the first timing monitor within a specified period of time for the functional paths that exceed a number of setup warnings generated by the second timing monitor for the canary paths.

In some implementations, the methods may cycle through the locations of the functional paths and the timing monitors over the predetermined period of time, e.g., if the number of setup warnings generated by the first timing monitor exceeds the number of warnings generated by the second timing monitor, then the methods may determine that a re-calibration event may be needed.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a device having core circuitry and hardware with functional paths and canary paths co-located with the functional paths. The device may have timing monitors that monitor and measure digital timing margins of the functional paths and the canary paths during droop events. The device may have a control processor that sets-up parameters for hardware droop mitigation based on the digital timing margins. Also, the control processor may calibrate the hardware for droop response or for adaptive clock and power control for droop mitigation based on the digital timing margins.

Described herein are various implementations of a method that forms and distributes a cluster of timing monitors in a floorplan of core circuitry. The method may identify functional paths with near-critical setup timing in the core circuitry, and the method may select and couple the functional paths to nearby timing monitors. The method may co-locate canary paths with the functional paths in the core circuitry and couple the canary paths to nearby timing monitors, and the method may group the timing monitors into a monitor group so as to provide control and data connectivity to a control processor sub-system.

Described herein are various implementations of a method that identifies functional paths in core circuitry with minimum setup timing margins. The method may co-locate canary paths with the functional paths in the core circuitry, and the method may calibrate the functional paths by running a test workload on the functional paths and tuning the canary paths to the functional paths. The method may perform runtime verification by cycling through locations of the functional paths and the timing monitors over a predetermined period of time.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:

core circuitry having hardware with functional paths and canary paths that are co-located with the functional paths;

timing monitors that monitor and measure digital timing margins of the functional paths and the canary paths during droop events; and a control processor that sets-up parameters for hardware droop mitigation based on the digital timing margins, wherein the control processor calibrates the hardware for droop response or for adaptive clock and power control for droop mitigation based on the digital timing margins.

2. The device of claim 1, wherein:

the timing monitors are clustered in sets of multiple timing monitors, a first timing monitor in each set of multiple timing monitors provides for an upper boundary level of alarm for droop mitigation, a second timing monitor in each set of multiple timing monitors provides for an intermediate level of alarm for droop mitigation, and a third timing monitor in each set of multiple timing monitors provides for a lower boundary level of alarm for droop mitigation.

3. The device of claim 1, wherein:

each timing monitor provides multiple capture observation points for measuring digital timing margins associated with the functional paths.

4. The device of claim 1, wherein:

the core circuitry executes a test sequence that tests the functional paths under a test-workload with predetermined path activation for each functional path so as to determine at least one functional path with a minimum timing margin specific to the device under test.

5. The device of claim 4, wherein:

the control processor determines the required delay to add to canary paths, such that the canary paths indicate a timing alarm under conditions that lead to an alarm of the functional paths while running the test workload, and the control processor uses the required delay to calibrate the delays between the worst functional path and the canary paths.

6. The device of claim 5, wherein:

during operation of the core circuitry, the control processor interfaces with the timing monitors to monitor the canary paths for alarms and to determine severity of the droop events based on the alarms observed from the timing monitors, and each timing monitor is assigned to a group and each group is assigned a delay margin so as to classify severity of the droop events.

7. The device of claim 1, wherein:

the timing monitors monitor the digital timing margins so as to refine voltage supply and clock setup of the core circuitry.

8. The device of claim 1, wherein:

the timing monitors select and add additional delays to the input signal of a flop so as to detect timing margins in units of gate delay.

9. The device of claim 1, wherein:

the canary circuits have predictable switching characteristics that are used for online monitoring following a calibration to the timing characteristics of the functional paths.

10. The device of claim 1, wherein:

the functional paths include transistor paths with transistor delay that are sensitive to transistor skew, complexity of gates, and averaging of random variation, and the functional paths include interconnect paths with interconnect delay that are sensitive to transistor skew, wire skew, and exposure to random variation of driver logic.

* * * * *